United States Patent
Kim et al.

(10) Patent No.: US 11,056,738 B2
(45) Date of Patent: Jul. 6, 2021

(54) METAL-AIR BATTERY

(71) Applicant: SAMSUNG ELECTRONICS CO., LTD., Suwon-si (KR)

(72) Inventors: Mokwon Kim, Suwon-si (KR); Heungchan Lee, Seongnam-si (KR); Sangbok Ma, Suwon-si (KR); Jungock Park, Yongin-si (KR); Hyunjin Kim, Seoul (KR); Wonsung Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/676,628

(22) Filed: Nov. 7, 2019

(65) Prior Publication Data

US 2020/0153067 A1    May 14, 2020

(30) Foreign Application Priority Data

Nov. 9, 2018  (KR) .................. 10-2018-0137597

(51) Int. Cl.
| | |
|---|---|
| *H01M 12/06* | (2006.01) |
| *H01M 12/04* | (2006.01) |
| *H01M 12/08* | (2006.01) |
| *H01M 8/0662* | (2016.01) |
| *H01M 4/86* | (2006.01) |
| *H01M 4/131* | (2010.01) |

(52) U.S. Cl.
CPC .......... *H01M 12/08* (2013.01); *H01M 4/131* (2013.01); *H01M 4/8657* (2013.01); *H01M 12/06* (2013.01)

(58) Field of Classification Search
None
See application file for complete search history.

(56) References Cited

U.S. PATENT DOCUMENTS

| | | | |
|---|---|---|---|
| 8,959,901 | B2 | 2/2015 | Mizuno et al. |
| 9,373,874 | B2 | 6/2016 | Ryou et al. |
| 10,008,753 | B2 | 6/2018 | Kwon et al. |
| 10,103,397 | B2 | 10/2018 | Kwon et al. |
| 2004/0197641 | A1 | 10/2004 | Visco et al. |
| 2008/0096061 | A1 | 4/2008 | Burchardt |
| 2012/0200253 | A1 | 8/2012 | Ryou et al. |
| 2016/0322686 | A1* | 11/2016 | Ko .................... H01M 12/08 |
| 2017/0222287 | A1 | 8/2017 | Suzuki et al. |
| 2017/0263980 | A1 | 9/2017 | Finsterbusch |
| 2019/0305313 | A1 | 10/2019 | Kim et al. |

(Continued)

FOREIGN PATENT DOCUMENTS

| | | |
|---|---|---|
| JP | 5751589 B2 | 7/2015 |
| KR | 101119514 B1 | 2/2012 |

(Continued)

OTHER PUBLICATIONS

Y. Suzuki et al., "Electrochemical performance of an all-solid-state lithium-oxygen battery under humidified oxygen," Solid State Ionics, Mar. 11, 2016, pp. 72-76.

*Primary Examiner* — Yoshitoshi Takeuchi
(74) *Attorney, Agent, or Firm* — Cantor Colburn LLP (57) ABSTRACT

A metal-air battery including a cathode including a metal; an anode including a composite conductive material; a solid electrolyte layer between the cathode and the anode; and a vapor supplier configured to supply a vapor to the anode and the solid electrolyte layer.

20 Claims, 8 Drawing Sheets

< EXAMPLE >

(56) References Cited

U.S. PATENT DOCUMENTS

| | | |
|---|---|---|
| 2019/0319322 A1 | 10/2019 | Kwon et al. |
| 2019/0382525 A1 | 12/2019 | Lee et al. |
| 2020/0091574 A1 | 3/2020 | Lee et al. |
| 2020/0112054 A1 | 4/2020 | Lee et al. |
| 2020/0118769 A1 | 4/2020 | Ma et al. |
| 2020/0119346 A1 | 4/2020 | Ma et al. |
| 2020/0119391 A1 | 4/2020 | Ma et al. |
| 2020/0220179 A1 | 7/2020 | Choi et al. |

FOREIGN PATENT DOCUMENTS

| | | |
|---|---|---|
| KR | 1020140061735 A | 5/2014 |
| KR | 101553137 B1 | 9/2015 |
| KR | 1020170007110 A | 1/2017 |
| KR | 1020170013710 A | 2/2017 |

\* cited by examiner

[BEFORE DISCHARGE PROCESS]

FIG. 3B

[AFTER DISCHARGE PROCESS]

FIG. 3C

[AFTER CHARGE PROCESS]

FIG. 4

< EXAMPLE >

METAL-AIR BATTERY

CROSS-REFERENCE TO RELATED APPLICATION

This application claims priority to and the benefit of Korean Patent Application No. 10-2018-0137597, filed on Nov. 9, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to a secondary battery, and more particularly, to a metal-air battery.

2. Description of the Related Art

Metal-air batteries include a cathode that may absorb and emit ions and an anode that uses oxygen in the air as an active material. In the anode, reduction and oxidation of oxygen introduced from outside of the battery occur. In the cathode, oxidation and reduction of a metal occur. Chemical energy is converted into electrical energy and extracted. For example, metal-air batteries absorb oxygen upon discharging and discharge oxygen upon charging. Because metal-air batteries use oxygen present in the air, the energy density of the battery may be greatly improved. For example, metal-air batteries may have energy densities several times higher than lithium ion batteries.

In a metal-air battery, the anode may serve as an electron transfer path and an ion transfer path. Therefore, the capacity and performance of the metal-air battery may be considerably influenced by, for example, the material and configuration of the anode (air electrode). When the metal-air battery is implemented as an all-solid-state metal-air battery including a solid electrolyte, a problem of a reaction rate being decreased may occur due to low metal ion conductivity, electron conductivity, and large interface resistance of the anode and the solid electrolyte. Thus there remains a need for improved battery materials and an improved metal-air battery.

SUMMARY

Provided is a metal-air battery.

Additional aspects will be set forth in part in the description which follows and, in part, will be apparent from the description, or may be learned by practice of the presented embodiments.

According to an aspect of an embodiment, a metal-air battery includes: a cathode comprising a metal; an anode comprising a composite conductive material; a solid electrolyte layer between the cathode and the anode; and a vapor supplier configured to supply a vapor to the anode and the solid electrolyte layer.

An electron conductivity of the composite conductive material may be greater than or equal to about $10^{-9}$ Siemens per centimeter and less than or equal to about $10^{-1}$ Siemens per centimeter and an ion conductivity of the composite conductive material may be greater than or equal to about $10^{-9}$ Siemens per centimeter and less than or equal to about $10^{-1}$ Siemens per centimeter.

The composite conductive material may include an inorganic solid compound.

The composite conductive material may include lithium titanium oxide ("LTO"), lithium manganese oxide ("LMO"), lithium cobalt oxide ("LCO"), lithium manganese nickel oxide ("LMNO"), lithium nickel manganese cobalt oxide ("NMC"), lithium nickel oxide ("LNO"), lithium iron phosphate ("LFP"), lithium iron manganese phosphate ("LFMP"), lithium lanthanum titanium oxide ("LLTO"), lithium aluminum titanium phosphate ("LATP"), lithium lanthanum manganese oxide ("LLMnO"), lithium lanthanum ruthenium oxide ("LLRuO"), a lithium deintercalation product, or a combination thereof.

The composite conductive material may include an inorganic material having a Perovskite structure, an anti-Perovskite structure, a layered structure, a spinel structure or NASICON structure.

The solid electrolyte layer may include a metal ion conductive material.

According to an aspect of an embodiment, a metal-air battery includes: a cell module configured to generate electricity by oxidation of a metal and reduction of oxygen and a vapor; a vapor supplier configured to supply the vapor to the cell module; and an air purifier which is in fluid communication with the vapor supplier and provides a purified air to the vapor supplier, wherein the cell module includes: a cathode comprising a metal; an anode comprising a composite conductive material; and a solid electrolyte layer between the cathode and the anode.

The metal-air battery may further include: a first fluid regulator configured to regulate a flow of the purified air and the vapor from the vapor supplier to the cell module; and a second fluid regulator configured to regulate a flow of fluid from the cell module to an outside of the cell module.

The metal-air battery may further include: an oxygen concentration measurer configured to measure an oxygen concentration in the cell module; a vapor concentration measurer configured to measure a vapor concentration in the cell module; and a controller configured to control opening and closing of the first fluid regulator and the second fluid regulator according to the oxygen concentration and the vapor concentration in the cell module.

The air purifier may provide a vapor condenser configured to remove vapor in an outside air, and an oxygen concentration adjuster configured to remove nitrogen and carbon dioxide in the outside air to control the oxygen concentration in the cell module.

The vapor condenser may condense vapor in the cell module.

The metal-air battery may further include: a pump configured to apply a negative pressure to the cell module to recover the vapor condensed by the vapor condenser from the cell module.

The metal-air battery may further include: a third fluid regulator configured to regulate the flow of the purified air from the oxygen concentration adjuster to the cell module; and a fourth fluid regulator configured to regulate the flow of fluid from the vapor supplier to the cell module.

The metal-air battery may further include: an oxygen concentration measurer configured to measure oxygen concentration in the cell module; a vapor concentration measurer configured to measure vapor concentration in the cell module; and a controller configured to control opening and closing of the third fluid regulator and the fourth fluid regulator according to the oxygen concentration and the vapor concentration in the cell module.

An electron conductivity of the composite conductive material may be greater than or equal to about $10^{-9}$ Siemens per centimeter and less than or equal to about $10^{-1}$ Siemens per centimeter and an ion conductivity of the composite conductive material may be greater than or equal to about $10^{-9}$ Siemens per centimeter and less than or equal to about $10^{-1}$ Siemens per centimeter.

The composite conductive material may include an inorganic solid compound.

The composite conductive material may include lithium titanium oxide ("LTO"), lithium manganese oxide ("LMO"), lithium cobalt oxide ("LCO"), lithium manganese nickel oxide ("LMNO"), lithium nickel manganese cobalt oxide ("NMC"), lithium nickel oxide ("LNO"), lithium iron phosphate ("LFP"), lithium iron manganese phosphate ("LFMP"), lithium lanthanum titanium oxide ("LLTO"), lithium aluminum titanium phosphate ("LATP"), lithium lanthanum manganese oxide ("LLMnO"), lithium lanthanum ruthenium oxide ("LLRuO"), a lithium deintercalation product, or a combination thereof.

The composite conductive material may include an inorganic material a Perovskite structure, an anti-Perovskite structure, a layered structure, and a spinel structure or NASICON structure.

The solid electrolyte layer may include a metal ion conductive material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, a metal-air battery according to various embodiments will be described with reference to the accompanying drawings. The width and thickness of layers or elements illustrated in the accompanying drawings may be somewhat exaggerated for convenience and clarity of description. Like reference numerals refer to like elements throughout the detailed description. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "vapor" refers to a substance, e.g., water, in a gas phase, which can be condensed to form a liquid.

Figure 1:
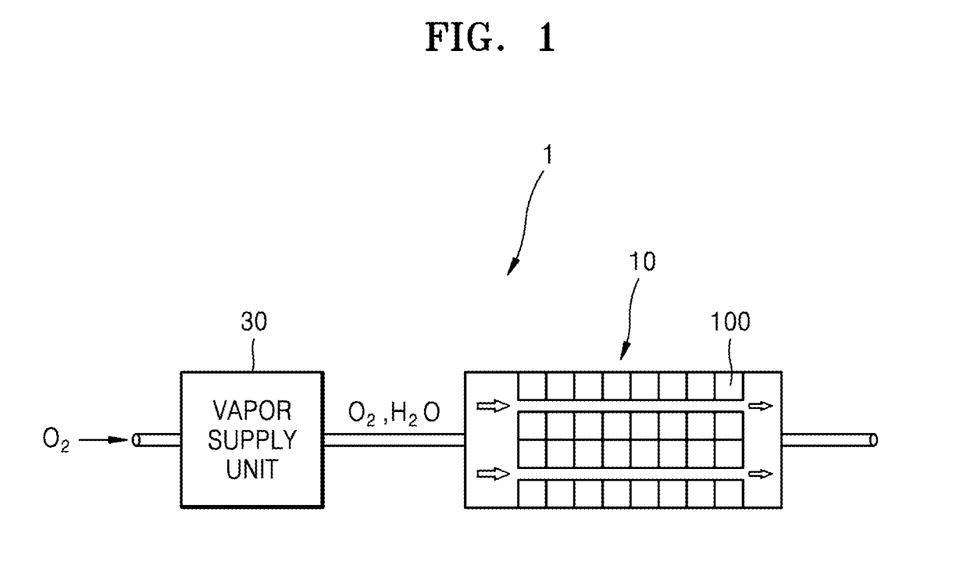
FIG. 1 is a view of an embodiment of a metal-air battery.
Figure 2:
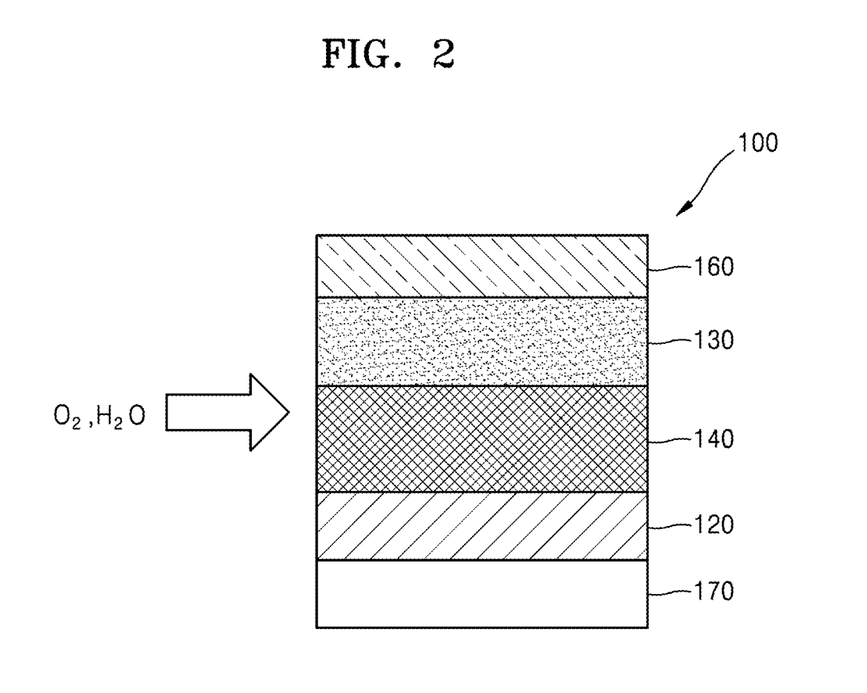
FIG. 2 is a view of an embodiment of a battery shown in FIG. 1.
Figure 3A:
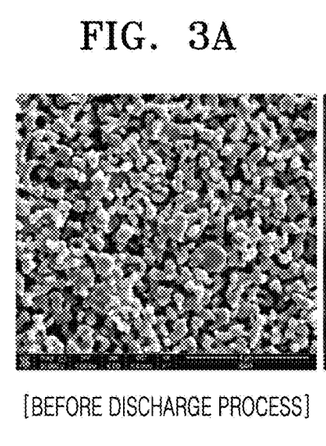
FIG. 3A, FIG. 3B, and FIG. 3C are scanning electron microscope (SEM) photographs of a surface of an anode before discharge, after discharge, and after charge, respectively, showing a discharge product formed on the surface of an anode in a discharge and charge process.
Figure 3B:
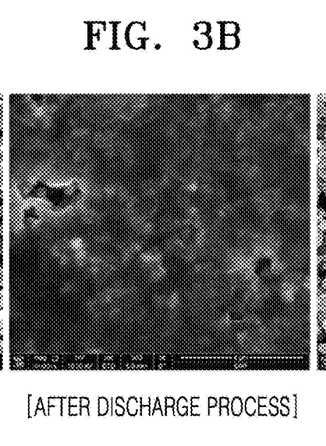
Figure 3C:
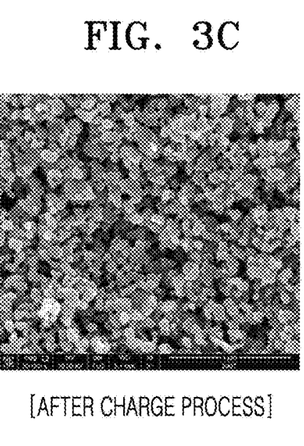

FIG. 1 is a view of an embodiment of a metal-air battery, and FIG. 2 is a view of an embodiment of a battery module shown in FIG. 1. FIG. 3A, FIG. 3B, and FIG. 3C are scanning electron microscope ("SEM") photographs of an embodiment of a discharge product formed on the surface of an anode in a discharge and charge process.

Referring to FIGS. 1 and 2, a metal-air battery 1 according to an embodiment may include a battery module 10 and a vapor supply unit 30, e.g., a vapor supplier 30. The battery module 10 may include a plurality of cells 100 and may generate electricity by oxidation of a metal and reduction of oxygen and vapor. The cell 100 according to an embodiment may include a cathode 120, an anode 130, a solid electrolyte layer 140, a cathode electrolyte layer 150, and an anode current collector 160.

The cathode 120 may include a material capable of absorbing and emitting metal ions. Such a material may include, for example, lithium (Li), sodium (Na), zinc (Zn), potassium (K), calcium (Ca), magnesium (Mg), iron (Fe), aluminum (Al), or a combination thereof, e.g., an alloy of two or more of the foregoing metals. For example, the cathode 120 may include Li. In this case, the cathode 120 may include Li, a Li-based alloy, a Li intercalation compound, or a combination thereof. When the cathode 120 includes Li, the metal-air battery according to an embodiment may be referred to as a 'Li-air battery'.

The anode 130 may include an electrode using oxygen ($O_2$) and vapor ($H_2O$) in the air as an active material. For the electrochemical reaction of metal ions provided from the cathode 120 and gas e.g., oxygen) and vapor provided to the anode 130, the anode 130 may provide a movement path of metal ions and electrons.

When the metal-air battery 1 according to an embodiment is the Li-air battery, the following electrochemical reaction may occur in the anode 130 during discharge.

$2Li^+ + 1/2O_2 + H_2O + 2e^- \leftrightarrow 2LiOH$

Lithium ions ($Li^+$) provided from the cathode 120 and oxygen ($O_2$) and vapor ($H_2O$) provided from the atmosphere (air) may be bonded (reacted) together with electrons ($e^-$) at a surface of the anode 130 to generate lithium hydroxide (LiOH). At this time, the anode 130 may provide both a movement path of lithium ions ($Li^+$) and a movement path of electrons ($e^-$). The lithium hydroxide (LiOH) generated is an example of a reaction product. Upon charging, a discharge reaction may be reversely performed, e.g., such that LiOH is consumed and Li, $O_2$, and $H_2O$, are generated.

As described above, the anode 130 may provide the movement paths of lithium ions ($Li^+$) and electrons ($e^-$). As an example, cation conductivity of the anode 130 may be greater than or equal to about $10^{-9}$ Siemens per centimeter (S/cm) and less than or equal to about $10^{-1}$ S/cm and electron conductivity of the anode 130 may be greater than or equal to about $10^{-9}$ S/cm and less than or equal to about $10^{-1}$ S/cm. In addition, as an example, the anode 130 may include a composite conductive material capable of both electron conduction and ion conduction. To adjust cation conductivity and electron conductivity of the composite conductive material, a composition ratio or a dopant of the composite conductive material may be controlled. Even in the case of materials of the same composition, the cation conductivity and the electron conductivity may vary depending on the composition ratio and the dopant. The composite conductive material may include, for example, a Li-based oxide, a Na-based oxide, or a combination thereof.

As a specific example, the composite conductive material may include lithium titanium oxide ("LTO"), lithium manganese oxide ("LMO"), lithium cobalt oxide ("LCO"), lithium manganese nickel oxide ("LMNO"), lithium nickel manganese cobalt oxide ("NMC"), lithium nickel oxide ("LNO"), lithium iron phosphate ("LFP"), lithium iron manganese phosphate ("LFMP"), lithium lanthanum titanium oxide ("LLTO"), lithium aluminum titanium phosphate ("LATP"), lithium lanthanum manganese oxide ("LLMnO"), lithium lanthanum ruthenium oxide ("LLRuO"), a lithium deintercalation product thereof, or a combination thereof. Characteristics of the ion conduction and electron conduction may be appropriately selected by controlling the composition ratio or the dopant of the above materials. However, the specific materials set forth herein are illustrative, and various other materials may be applied as the composite conductive material. Furthermore, the composite conductive material may have a Perovskite structure, an anti-Perovskite structure, a layered structure, a spinel structure, or a structure similar to that of a sodium super ionic conductor, e.g., ("NASICON structure"). The composite conductive material may include an inorganic-based solid compound comprising a metal element. The composite conductive material may also be a non-carbon-based material.

The solid electrolyte layer 140 may provide a movement path of metal ions provided from the cathode 120. For example, the solid electrolyte layer 140 may include a metal ion conductive material.

As a specific example, the metal ion conductive material may include lithium phosphorous oxynitride ("LiPON"), lithium lanthanum zirconium oxide ("LLZO"), Perovskite-based LLTO, NASICON-based LATP, a LISICON-based lithium zinc germanium oxide ("LZGO") material, or a combination thereof. As an example, the cathode electrolyte layer 150 may be included between the cathode 120 and the solid electrolyte layer 140 to form a stable interface.

As described above, the composite conductive material included in the anode 130 and the metal ion conductive material included in the solid electrolyte layer 140 may be the inorganic-based solid compound. Accordingly, the anode 130 and the solid electrolyte layer 140 may include an electrode that does not include an organic electrolyte, that is, an organic electrolyte-free electrode may be provided. In addition, the anode 130 may include an electrode that does not include a liquid electrolyte, that is, a liquid electrolyte-free electrode may be provided.

A gas diffusion layer that absorbs oxygen in the atmosphere and provides oxygen to the anode 130 may be included. To this end, the gas diffusion layer may have a porous structure so as to smoothly diffuse oxygen. For example, the gas diffusion layer may be formed using carbon paper, carbon cloth, carbon felt using carbon fiber, or a sponge foam metal or metal fiber mat. However, the anode 130 may be manufactured in the porous structure or a similar structure to serve as the gas diffusion layer. In this case, the gas diffusion layer may be omitted.

The anode current collector may be arranged in contact with the gas diffusion layer. For example, the anode current collector 160 may include, for example, stainless steel ("SUS"). In this case, SUS of the anode current collector 160 may have a mesh structure for permeation of air (gas). The material of the anode current collector 160 is not limited to SUS, and may vary. When the gas diffusion layer is not used, the anode current collector 160 may be in contact with the anode current collector 160.

A cathode current collector 170 may be arranged to be in contact with the cathode 120. The cathode current collector 170 may be provided below the cathode 120. Therefore, the cathode 120 may be between the cathode current collector 170 and the cathode electrolyte layer 150. The cathode current collector 170 may include, for example, SUS or other conductors. The cathode current collector 170 may be regarded as a part of the cathode 120, and similarly, the anode current collector 160 may be regarded as a part of the anode 130.

The metal-air battery 1 according to an embodiment may be a liquid electrolyte-free battery that does not include a liquid electrolyte. Also, the metal-air battery 1 according to an embodiment may be an organic electrolyte-free battery which does not include an organic electrolyte. Thus, the metal-air battery 1 may be the organic electrolyte-free or the liquid electrolyte-free battery.

As described above, when the cell 100 is implemented as a liquid electrolyte-free all-solid-state metal-air battery, a problem of decreasing a reaction rate may occur due to low metal ion conductivity, low electron conductivity, and a large interface resistance of the anode 130 and the solid electrolyte layer 140. Thus, a primary purpose of an air intake system disposed in a metal-air battery according to the related art is to remove moisture, whereas in an embodiment implemented with the all-solid-state metal-air battery, an additive, for example, a vapor, which is capable of improving the metal ion conductivity and the electron conductivity and reducing a surface resistance, may be supplied.

The vapor supply unit 30 is a supply device capable of supplying a vapor (e.g., $H_2O$) to the battery module 10 to improve the metal ion conductivity and the electron conductivity of the anode 130 and reduce an interface resistance. For example, the vapor supply unit 30 may regulate a supply rate of water vapor ($H_2O$ gas) according to a charge/discharge rate of the metal-air battery 1.

Vapor (e.g., $H_2O$) supplied through the vapor supply unit 30 may adhere to the surface of the anode 130 to improve the metal ion conductivity and the electron conductivity and reduce the interface resistance. Vapor (e.g., $H_2O$) supplied through the vapor supply unit 30, as shown in FIG. 1, may be combined (reacted) with the electrons ($e^-$) at the surface of the anode 130 together with oxygen ($O_2$) supplied from the atmosphere (air) during the discharge process to generate lithium hydroxide (LiOH). Also, lithium hydroxide (LiOH) is decomposed to provide water vapor ($H_2O$) and lithium metal during the charge process. See FIG. 3A, FIG. 3B, and FIG. 3C.

As described above, in the metal-air battery 1 according to an example embodiment, as water vapor ($H_2O$) is supplied to the anode 130 together with the oxygen ($O_2$), the metal ions ($Li^+$) and the electrons e– move more easily by improving the metal ion conductivity and the electron conductivity and reducing the interfacial resistance. Therefore, it may be very advantageous in improving the performance/maintenance of the battery and prolonging the life thereof.

Figure 4:
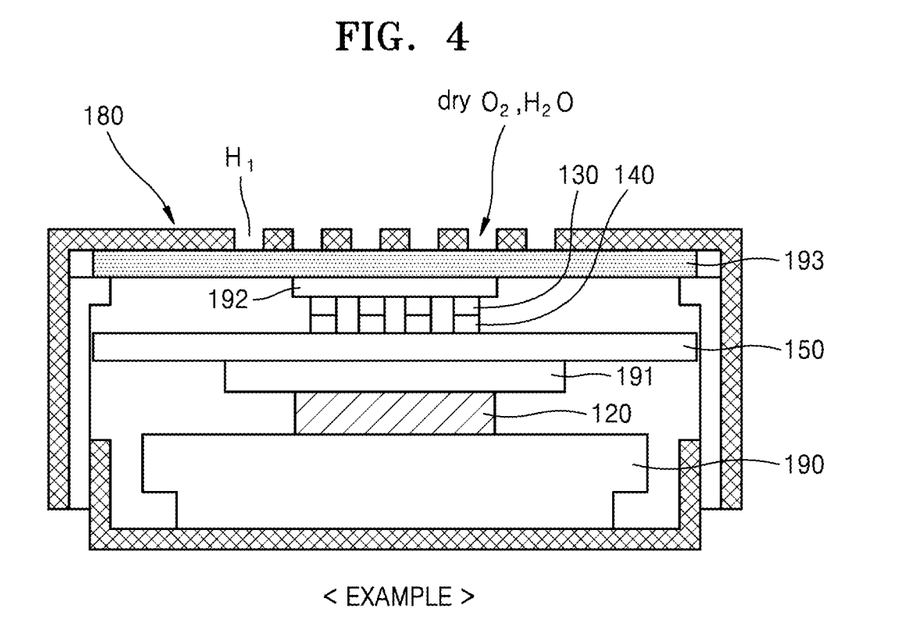
FIG. 4 is a cross-sectional view of an embodiment of a structure of a metal-air battery.

FIG. 4 is a cross-sectional view of an embodiment of a structure of a metal-air battery. The structure may be an experimental structure for evaluating the performance of a metal-air battery.

Referring to FIG. 4, the metal-air battery according to an embodiment has a coin cell shape. Components of the metal-air battery may be provided in a case 180 including a plurality of opening areas $H_1$. A support structure 190 may be provided on a lower inner surface of the case 180. The support structure 190 may include, for example, a spacer and a spring member. The cathode 120 including a metal may be provided on the support structure 190. A reaction inhibiting layer 191 and the cathode electrolyte layer 150 may be sequentially disposed on the cathode 120. The reaction inhibiting layer 191 is interposed between the cathode 120 and the cathode electrolyte layer 150 and may suppress/prevent a reaction therebetween. The reaction inhibiting layer 191 may have an ion conduction function.

The anode 130 and the solid electrolyte layer 140 may be arranged on the cathode electrolyte layer 150. The anode 130 and the solid electrolyte layer 140 may have a structure including a plurality of pores. Here, a polymer adhesive layer including poly(oxyethylene methacrylate) ("POEM") may be between the anode 130 and the solid electrolyte layer 140. An electrically conductive material layer (hereinafter the conductive layer) 192 may be provided on the anode 130. A gas diffusion layer 193 may be provided on the conductive layer 192. In the embodiment, the gas diffusion layer 193 may be arranged adjacent to the plurality of opening areas $H_1$ and may serve to supply the oxygen ($O_2$) and vapor ($H_2O$) to the anode 130. In a comparative example, a gas diffusion layer may be arranged adjacent to a plurality of opening areas and may serve to supply dry oxygen ($O_2$) to an anode, rather than supplying oxygen ($O_2$) and vapor ($H_2O$) to the anode.

As a specific example, the cathode 120 may include Li, the anode 130 may include $Li_4Ti_5O_{12}$ ("LTO") in Example 1, LLMnO in Example 2, and LLRuO in Example 3. The solid electrolyte layer 140 may include LATP. The cathode electrolyte layer 150 may further include 1 molar (M) lithium bis(trifluoromethanesulfonyl)imide ("LiTFSI")/poly(ethylene glycol) dimethyl ether ("PEGDME"). The conductive layer 192 may include Au.

It has been experimentally confirmed whether the oxygen ($O_2$) and water vapor ($H_2O$) or the oxygen ($O_2$) is reduced/oxidized on the surface of the anode 130 with respect to the metal-air battery described with reference to FIG. 4. To this end, characteristics evaluation was carried out in an atmosphere of oxygen ($O_2$) and water vapor ($H_2O$) or in an atmosphere of oxygen ($O_2$). Further, cyclability of the battery is evaluated by repeating a charge-discharge test on the metal-air battery.

Figure 5:
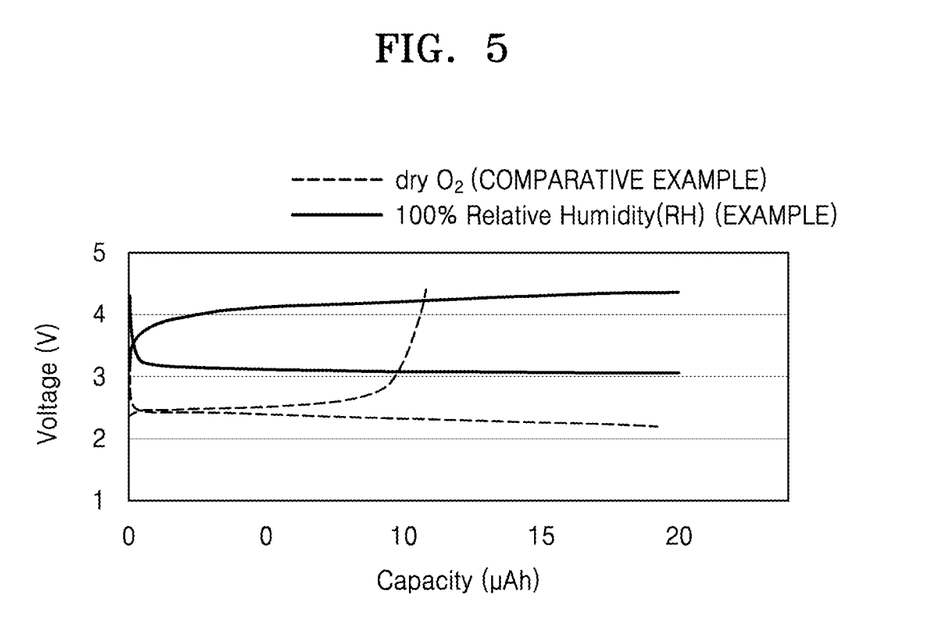
FIG. 5 is a graph of voltage (volts (V)) versus capacity (microampere hours (μAh)) showing simulation results for an electrochemical module of Example 1 and a comparative example.
Figure 6A:
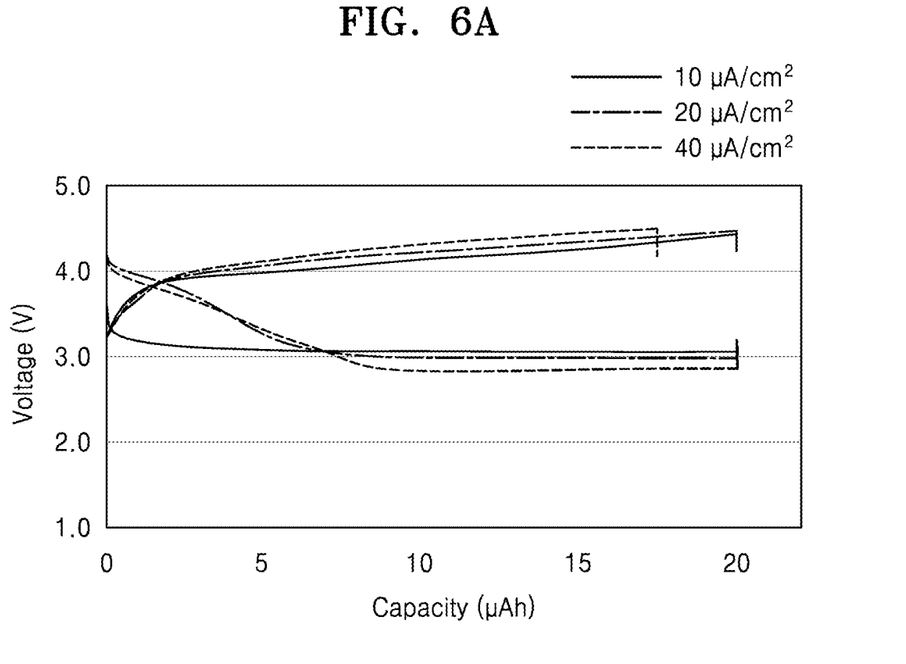
FIGS. 6A and 6B are graphs of voltage ((V) versus capacity (μAh) showing simulation results for an electrochemical module of Example 2 and Example 3.
Figure 6B:
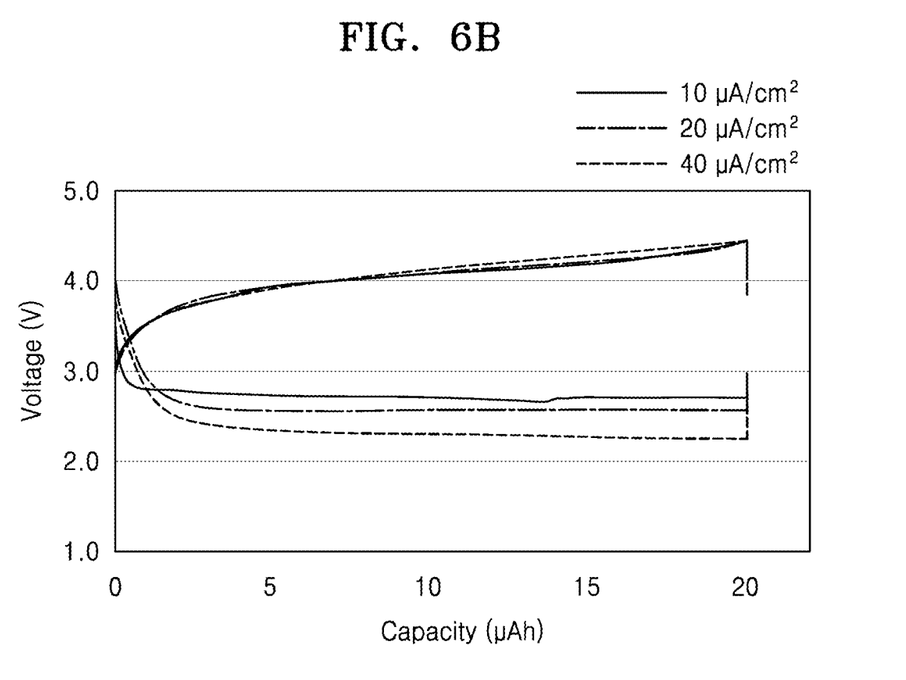

FIG. 5 is a discharge graph showing simulation results for an electrochemical module according to Example 1 and a comparative example. FIGS. 6A and 6B are discharge graphs showing simulation results for an electrochemical module according to Example 2 and Example 3.

Referring to FIGS. 4 and 5, in Example 1, an operating temperature of a battery included in the metal-air battery 1 is set to 40 degrees, and oxygen ($O_2$) and vapor ($H_2O$) are supplied such that the relative humidity becomes 100%, and a charge/discharge cycle is performed at a constant current of 1 microampere per square centimeter ($\mu A/cm^2$). In a comparative example, the battery included in the metal-air battery is set to an operating temperature of 40 degrees, dry oxygen ($O_2$) is supplied, and a charge/discharge cycle is performed at the constant current of 1 $\mu A/cm^2$.

As shown in FIG. 5, in the embodiment where oxygen ($O_2$) and water vapor ($H_2O$) are supplied such that the relative humidity becomes 100%, as compared with the comparative example in which only oxygen ($O_2$) is supplied, it may be seen that a reaction voltage $E^0$ increases from 2.96 V to 3.4 V, and the charge/discharge reproducibility and cyclability are improved. While not wanting to be bound by theory, it is understood this means that a metal ion conductivity and electron conductivity of the anode 130 are improved and an interface resistance decreases. Therefore, the metal-air battery 1 according to the embodiment in which water vapor ($H_2O$) is added to the anode 130 provided as a movement path for metal ions and electrons may be advantageous to improvement of the performance and increase of the lifespan of the metal-air battery 1.

Referring to FIGS. 5 to 6B, in Examples 2 and 3, LLMnO or LLRuO corresponding to a new perovskite-based anode material may be included in the anode 130. In Examples 2 and 3, an operating temperature of a battery included in the anode 130 is set to 40 degrees, and oxygen ($O_2$) and water vapor ($H_2O$) are supplied such that the relative humidity becomes 100%, and a charge/discharge cycle is performed at a constant current of 10 $\mu A/cm^2$, 20 $\mu A/cm^2$, and 40 $\mu A/cm^2$, respectively. When the anode 130 including an anode material having improved movement, e.g., conductivity, of metal ions and electrons is used as in Example 2 and Example 3, a charge/discharge rate of the metal-air battery 1 in Example 2 and Example 3 may be improved as compared with that of Example 1 in which $Li_4Ti_5O_{12}$ ("LTO") is included in the anode 130.

As described above, according to the supply of vapor ($H_2O$) and the kind of the anode 130, the movement, e.g., conductivity, of metal ions and electrons is improved and the interface resistance is reduced, which may be advantageous to improvement of the performance and increase of the lifespan of the metal-air battery 1. Hereinafter, the metal-air battery 1 capable of adjusting discharge and charge conditions by adjusting states of oxygen ($O_2$) and water vapor ($H_2O$) supplied according to discharge and charge state of the metal-air battery 1 will be further described.

Figure 7:
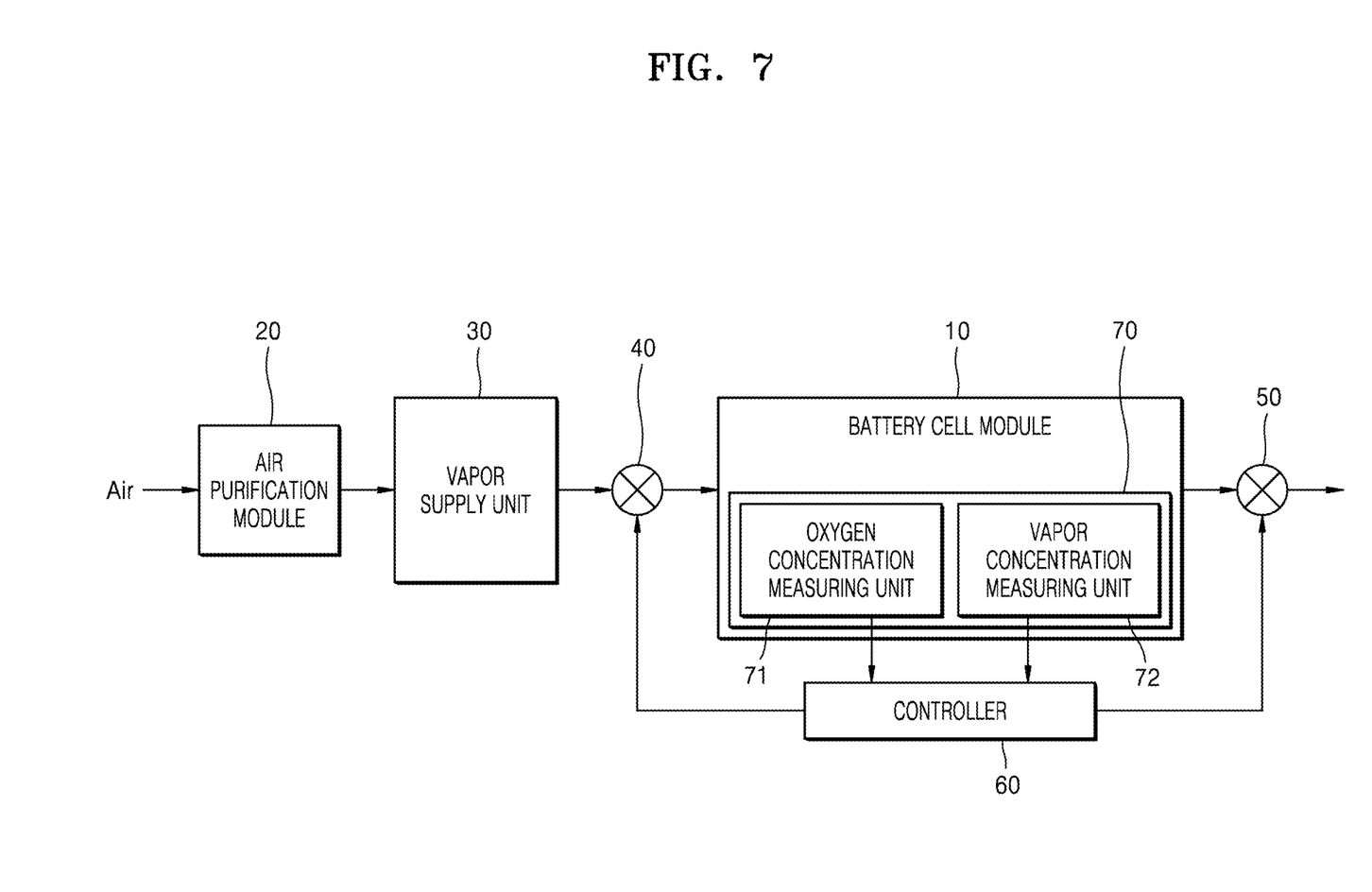
FIG. 7 is a block diagram of a schematic configuration of an embodiment of a metal-air battery.

FIG. 7 is a block diagram of a schematic configuration of an embodiment of the metal-air battery 1. Since the descriptions of the battery module 10 and the vapor supply unit 30 are substantially the same as those given with reference to FIGS. 1 and 2, the description thereof will not be given herein for convenience of explanation.

An air purification module 20, e.g., an air purifier 20, may purify the air by removing impurities such as vapor and carbon dioxide ($CO_2$) in the air and supply the purified air to the battery module 10. The air purification module 20 may be arranged to be in direct fluid communication with the battery module 10 or may be arranged to be in fluid communication with the battery module 10 via the vapor supply unit 30.

When the metal-air battery 1 is discharged, as shown in the above-mentioned reaction formula, oxygen and vapor may be supplied to the anode 130 such that oxygen and vapor may be used as an active material. Concentration of oxygen and vapor supplied to the battery module 10 including the anode 130 may be adjusted according to the discharge state of the metal-air battery 1.

A first fluid regulator 40 is a blocking device arranged between the battery module 10 and the vapor supply unit 30 and capable of regulating the fluid communication between the battery module 10 and the vapor supply unit 30. For example, the first fluid regulator 40 may include a check valve or an electronically driven opening/closing valve so that the fluid communication between the battery module 10 and the vapor supply unit 30 may be interrupted.

For example, when the check valve is between the battery module 10 and the vapor supply unit 30, vapor and purified air, for example, oxygen is transferred from the vapor supply unit 30 to the battery module 10, However, impurities generated in the battery module 10 during the discharge process of the metal-air battery 1 are interrupted by the check valve and may not be transferred to the vapor supply unit 30.

Furthermore, when the metal-air battery 1 is charged, oxygen and vapor are continuously generated from the anode 130 as shown in the above-mentioned reaction formula, and accordingly, the concentration of oxygen and vapor in the battery module 10 may be increased. As a result, a reverse reaction according to the reaction formula may be difficult to occur, and thus, the charging efficiency may be decreased. Therefore, when the metal-air battery 1 is charged, oxygen and vapor in the battery module 10 may be appropriately discharged to outside of the metal-air battery 1 according to use conditions of the metal-air battery 1 and internal conditions of the battery module 10.

A second fluid regulator 50 is a blocking device capable of regulating fluid communication from the battery module 10 to the outside of the metal-air battery 1. For example, the second fluid regulator 50 may be at a discharge portion of the battery module 10 to intercept the fluid communication between the battery module 10 and the outside of the metal-air battery 1. For example, the second fluid regulator 50 may be a check valve or an electronically driven opening/closing valve.

A controller 60 is a control device that may transmit control signals for interruption time and release time of the first fluid regulator 40 and the second fluid regulator 50 to the first fluid regulator 40 and the second fluid regulator 50 to control the interruption time and release time of the first fluid regulator 40 and the second fluid regulator 50. The control signals may be determined by oxygen concentration and vapor concentration inside the battery module 10 measured by a measuring unit 70, e.g., a measurer 70, to be described later below, for example, an oxygen concentration measuring unit 71, e.g., an oxygen concentration measurer 71, and a vapor concentration measuring unit 72, e.g., a vapor concentration measurer 72. As an example, the controller 60 may include a processor for controlling the overall function and operation of the metal-air battery 1, a program for the operation of the metal-air battery 1, a memory in which data may be stored, and a user interface including an output unit.

The measuring unit 70 is a measuring device that may measure a use state of the metal-air battery 1 and then transmit information about the use state to the controller 60. Here, the use state of the metal-air battery 1 may be a voltage, a charge amount of the metal-air battery 1, or the oxygen concentration or vapor concentration inside the battery module 10. To this end, the measuring unit 70 may include, for example, the oxygen concentration measuring unit 71 and the vapor concentration measuring unit 72. However, the disclosure is not limited thereto, and other state quantities that may affect the charge and discharge process of the metal-air battery 1 may also be measured.

As described above, when the metal-air battery 1 is charged, oxygen and vapor are continuously generated from the anode 130, and accordingly, the oxygen concentration or the vapor concentration inside the battery module 1. The oxygen and vapor generated during the charge process may be discharged to the outside of the metal-air battery 1, and/or may be reused through a separate recovery device.

Figure 8:
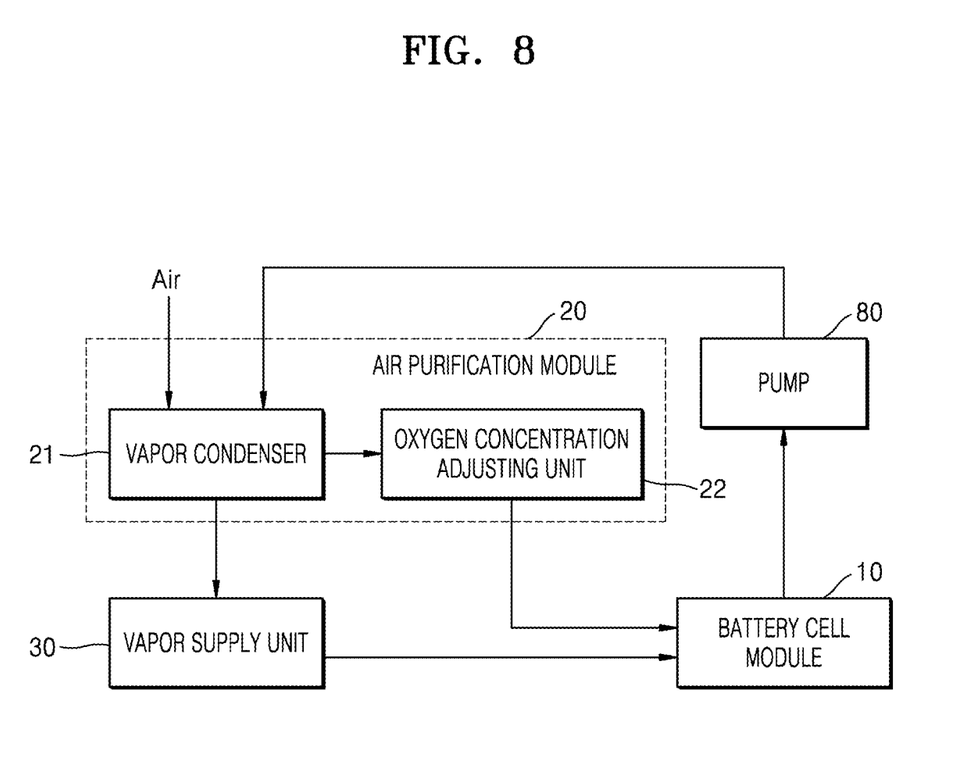
FIG. 8 is a block diagram of a schematic configuration of an embodiment of a metal-air battery.
Figure 9:
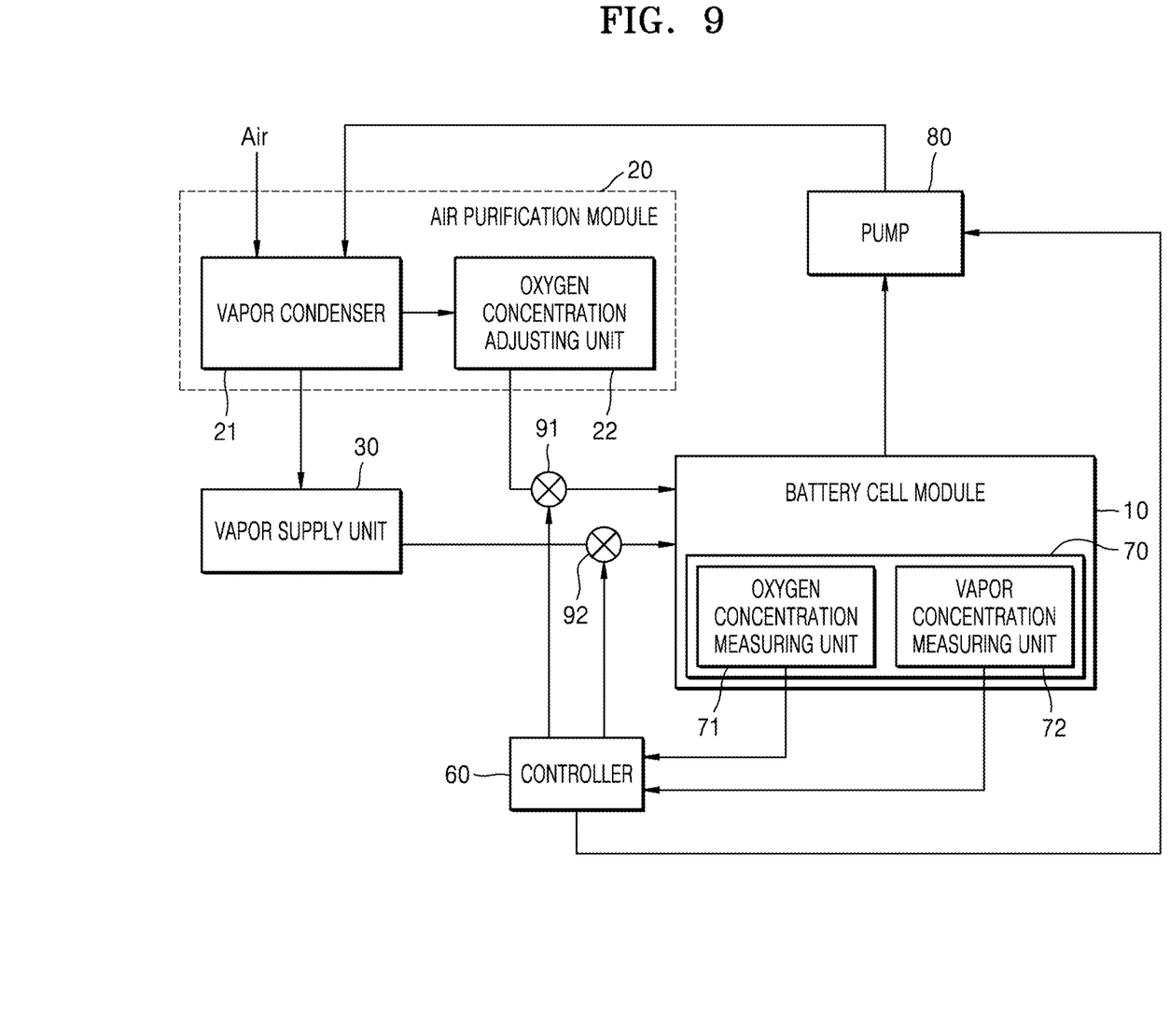
FIG. 9 is a block diagram of a schematic configuration of an embodiment of a metal-air battery.

FIG. 8 is a block diagram of a schematic configuration of an embodiment of the metal-air battery 1. FIG. 9 is a block diagram of a schematic configuration of the metal-air battery 1 according to another example. Since the descriptions of the battery module 10 and the vapor supply unit 30 are substantially the same as those given with reference to FIGS. 1 and 2, the description thereof will not be given herein for convenience of explanation.

Referring to FIG. 8, the air purification module 20 may purify the air by removing impurities such as vapor and $CO_2$ in the air and supply the purified air to the battery module 10. As an example, the air purification module 20 may include a vapor condenser 21 and an oxygen concentration adjusting unit 22, e.g., oxygen concentration adjuster 22. The vapor condenser 21 may condense vapor included in the air supplied from outside of the battery module 10 and vapor recovered from the battery module 10 using a pump 80 and transmit the condensed vapor to the vapor supply unit 30. The pump 80 may apply negative pressure to the battery module 10 to recover the vapor and the oxygen from the battery module 10. According to an embodiment, when the pump 80 is operated, oxygen and vapor generated from the anode 130 during the charge process may be discharged from the battery module 10 and recovered to the air purification module 20.

The oxygen concentration adjusting unit 22 may adjust the oxygen concentration by adsorbing and removing impurities included in the air supplied from the outside of the battery module 10, for example, $N_2$ and $CO_2$. As an example, the oxygen concentration adjusting unit 22 may be arranged to be in fluid communication with the vapor condenser 21. The oxygen concentration adjusting unit 22 may be supplied with outside air, e.g., air from outside of the battery module 10, from which vapor has been removed by the vapor condenser 21 and discharged products of the battery module 10. According to an embodiment, the oxygen concentration adjusting unit 22 may adsorb and remove impurities included the outside air, such as $N_2$ and $CO_2$, so that $O_2$ in which impurities have been removed from the oxygen concentration adjusting unit 22 may be supplied to the battery module 10. Further, the vapor supply unit 30 may transfer vapor ($H_2O$) to the battery module 10.

When the metal-air battery 1 is discharged, as shown in the above-mentioned reaction formula, oxygen and vapor may be supplied to the anode 130 such that the oxygen and vapor may be used as an active material. Concentration of the oxygen and vapor supplied to the battery module 10 including the anode 130 may be adjusted according to the discharge state of the metal-air battery 1. Also, when the metal-air battery 1 is charged, oxygen and vapor are continuously generated from the anode 130 as shown in the above-mentioned reaction formula, and accordingly, concentration of the oxygen and vapor in the battery module 10 may be increased. As a result, a reverse reaction according to the reaction formula may be difficult to occur, and thus, the charging efficiency may be decreased. Therefore, when the metal air cell 1 is charged, oxygen and vapor supplied to the inside of the battery module 10 may be blocked.

A third fluid regulator 91 is a blocking device arranged between the battery module 10 and the oxygen concentration adjusting unit 22 and capable of regulating the communication of purified air, for example, oxygen, generated between the battery module 10 and the oxygen concentration adjusting unit 22. For example, the third fluid regulator 91 may include a check valve or an electronically driven opening/closing valve so that the fluid communication between the battery module 10 and the oxygen concentration adjusting unit 22 may be interrupted.

A fourth fluid regulator 92 is a blocking device arranged between the battery module 10 and the vapor supply unit 30 and capable of regulating the communication of vapor generated between the battery module 10 and the vapor supply unit 30. For example, the fourth fluid regulator 92 may include a check valve or an electronically driven opening/closing valve so that the fluid communication between the battery module 10 and the vapor supply unit 30 may be interrupted.

The controller 60 is a control device that may transmit control signals for interruption time and release time of the third fluid regulator 91 and the fourth fluid regulator 92 to the third fluid regulator 91 and the fourth fluid regulator 92 to control the interruption time and release time of the third fluid regulator 91 and the fourth fluid regulator 92. The control signals may be determined by the oxygen concentration and vapor concentration inside the battery module 10 measured by the measuring unit 70 to be described later below, for example, the oxygen concentration measuring unit 71 and the vapor concentration measuring unit 72.

The measuring unit 70 is a measuring device that may measure a use state of the metal-air battery 1 and then transmit information about the use state to the controller 60. For example, the measuring unit 70 may include the oxygen concentration measuring unit 71 and the vapor concentration measuring unit 72. The controller 60 may determine control signals for interruption time and release time of the third fluid regulator 91 and the fourth fluid regulator 92 according to the oxygen concentration and vapor concentration inside the battery module 10 received from the oxygen concentration measuring unit 71 and the vapor concentration measuring unit 72 to adjust the charge and discharge states of the metal-air battery 1.

The metal-air battery according to the embodiments described above may improve movement, e.g., conductivity, of metal ions and electrons and reduce interface resistance by using vapor as well as oxygen as an active material for an anode including a composite conductive material, thereby reducing the voltage drop due to overcharge, which may be advantageous to improvement of the performance and increase of the lifespan of the metal-air battery. Furthermore, the metal-air battery may adjust the charge and discharge states of the metal-air battery by controlling supply of vapor and air supplied into a battery module. Such a metal-air battery may be applied as a power source for various electronic devices including electric vehicles. The metal-air battery according to the embodiments may be applied to all fields to which a secondary battery is applied.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A metal-air battery comprising:
   a cathode comprising a metal;
   an anode comprising a composite conductive material;
   a solid electrolyte layer between the cathode and the anode; and
   a vapor supplier configured to supply a vapor to the anode and the solid electrolyte layer.

2. The metal-air battery of claim 1, wherein an electron conductivity of the composite conductive material is greater than or equal to about $10^{-9}$ Siemens per centimeter and less than or equal to about $10^{-1}$ Siemens per centimeter and an ion conductivity of the composite conductive material is greater than or equal to about $10^{-9}$ Siemens per centimeter and less than or equal to about $10^{-1}$ Siemens per centimeter.

3. The metal-air battery of claim 1, wherein the composite conductive material comprises an inorganic solid compound.

4. The metal-air battery of claim 1, wherein the composite conductive material comprises lithium titanium oxide, lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, lithium lanthanum manganese oxide, lithium lanthanum ruthenium oxide, a lithium deintercalation product, or a combination thereof.

5. The metal-air battery of claim 1, wherein the composite conductive material comprises an inorganic material having a Perovskite structure, an anti-Perovskite structure, a layered structure, a spinel structure or NASICON structure.

6. The metal-air battery of claim 1, wherein the solid electrolyte layer comprises a metal ion conductive material.

7. The metal-air battery of claim 1, comprising:
   a cell module comprising the cathode, the anode, and the solid electrolyte and configured to generate electricity by oxidation of the metal and reduction of oxygen and the vapor; and
   an air purifier which is in fluid communication with the vapor supplier and provides a purified air to the vapor supplier.

8. The metal-air battery of claim 7, further comprising:
   a first fluid regulator configured to regulate a flow of the purified air and the vapor from the vapor supplier to the anode and the solid electrolyte layer; and
   a second fluid regulator configured to regulate a flow of fluid from the cell module to an outside of the cell module.

9. The metal-air battery of claim 8, further comprising:
   an oxygen concentration measurer configured to measure an oxygen concentration in the cell module;
   a vapor concentration measurer configured to measure a vapor concentration in the cell module; and
   a controller configured to control opening and closing of the first fluid regulator and the second fluid regulator according to the oxygen concentration and the vapor concentration in the cell module.

10. The metal-air battery of claim 7, wherein the air purifier provides a vapor condenser configured to remove vapor in an outside air, and an oxygen concentration adjuster configured to remove nitrogen and carbon dioxide in the outside air to control the oxygen concentration in the cell module.

11. The metal-air battery of claim 10, wherein the vapor condenser is configured to condense vapor in the cell module.

12. The metal-air battery of claim 11, further comprising:
    a pump configured to apply a negative pressure to the cell module to recover the vapor condensed by the vapor condenser from the cell module.

13. The metal-air battery of claim 10, further comprising:
    a third fluid regulator configured to regulate the flow of the purified air from the oxygen concentration adjuster to the cell module; and
    a fourth fluid regulator configured to regulate the flow of fluid from the vapor supplier to the anode and the solid electrolyte layer.

14. The metal-air battery of claim 13, further comprising:
    an oxygen concentration measurer configured to measure oxygen concentration in the cell module;
    a vapor concentration measurer configured to measure vapor concentration in the cell module; and
    a controller configured to control opening and closing of the third fluid regulator and the fourth fluid regulator according to the oxygen concentration and the vapor concentration in the cell module.

15. The metal-air battery of claim 7, wherein an electron conductivity of the composite conductive material is greater than or equal to about $10^{-9}$ Siemens per centimeter and less than or equal to about $10^{-1}$ Siemens per centimeter and an ion conductivity of the composite conductive material is greater than or equal to about $10^{-9}$ Siemens per centimeter and less than or equal to about $10^{-1}$ Siemens per centimeter.

16. The metal-air battery of claim 7, wherein the composite conductive material comprises an inorganic solid compound.

17. The metal-air battery of claim 7, wherein the composite conductive material comprises lithium titanium oxide, lithium manganese oxide, lithium cobalt oxide, lithium manganese nickel oxide, lithium nickel manganese cobalt oxide, lithium nickel oxide, lithium iron phosphate, lithium iron manganese phosphate, lithium lanthanum titanium oxide, lithium aluminum titanium phosphate, lithium lanthanum manganese oxide, lithium lanthanum ruthenium oxide, a lithium deintercalation product thereof, or a combination thereof.

18. The metal-air battery of claim 7, wherein the composite conductive material comprises an inorganic material having a Perovskite structure, an anti-Perovskite structure, a spinel structure or NASICON structure.

19. The metal-air battery of claim 7, wherein the solid electrolyte layer comprises a metal ion conductive material.

20. A method of operating metal-air battery of claim 1, the method comprising:
    providing the metal-air battery;
    supplying water vapor to the anode;
    supplying oxygen to the anode; and
    regulating a supply rate of the water vapor according to a charge/discharge rate of the metal-air battery to operate the metal-air battery.

* * * * *